United States Patent [19]

Nathanson et al.

[11] B 3,989,890

[45] Nov. 2, 1976

[54] OPTICAL IMAGING SYSTEM UTILIZING A LIGHT VALVE ARRAY AND A COUPLED PHOTOEMISSIVE TARGET

[75] Inventors: Harvey C. Nathanson, Pittsburgh, Pa.; Jens Guldberg, Hamburg, Germany; Daniel R. Muss, Pittsburgh, Pa.

[73] Assignee: Westinghouse Electric Corporation, Pittsburgh, Pa.

[22] Filed: Feb. 14, 1974

[21] Appl. No.: 442,970

[44] Published under the second Trial Voluntary Protest Program on February 3, 1976 as document No. B 442,970.

[52] U.S. Cl. .............................................. 178/7.3 D

[51] Int. Cl.$^2$ .......................................... H04N 3/16

[58] Field of Search ......... 358/62; 178/7.5 D, 7.3 D

[56] References Cited

UNITED STATES PATENTS

| | | | |
|---|---|---|---|
| 2,740,830 | 4/1956 | Gretener | 358/62 |
| 3,592,529 | 7/1971 | Juhlin et al. | 358/62 |
| 3,746,911 | 7/1973 | Nathanson et al. | 178/7.5 D |

*Primary Examiner*—Albert J. Mayer
*Attorney, Agent, or Firm*—W. G. Sutcliff

[57] ABSTRACT

An optical imaging system which includes a light valve array target for producing the output image, and a photoemissive target which is responsive to input radiation to produce the desired informational pattern which is reproduced in the output stage. The input radiation generates photoelectrons in the photoemissive target and these photoelectrons are used to produce an electrostatic field on the deformable light valve elements.

7 Claims, 6 Drawing Figures

OPTICAL IMAGING SYSTEM UTILIZING A LIGHT VALVE ARRAY AND A COUPLED PHOTOEMISSIVE TARGET

BACKGROUND OF THE INVENTION

The present invention relates to optical imaging systems and more particularly an imaging system in which an electrostatically deflectable light valve array target is utilized. Such light valves are described in U.S. Pat. No. 3,746,911. Such light valves are used in conjunction with an optical system which permits read-out of an informational pattern which corresponds to the electrostatic pattern established on the light valve array.

The present invention relates to the means for establishing the electrostatic charge image on the light valve array. In general, a cathode ray beam has been utilized to establish the charge pattern for such light valve. The light valve structure taught in U.S. Pat. No. 3,746,911 is particularly adaptive for use with a photoemissive means which permits elimination of the cathode ray beam generating equipment in producing an optical imaging system.

The coupling of a photoemissive target with a light valve target permits the device to function as a light amplifier, wavelength converter, or other analogous optical information processor.

SUMMARY OF THE INVENTION

An optical imaging system comprising, an evacuated hermetically sealed system, which includes an input radiation transmissive substrate. A spaced imaging radiation transmissive substrate is provided which includes an array of electrostatically deflectable, reflective, light valves which are supported on the imaging substrate, with a generally planar deflectable portion disposed at the extending end of the central support post. A light reflective layer is disposed at the top of a generally planar deflectable portion. An electrode grid is disposed on the imaging substrate between the spaced apart light valves. A photoemissive means is coupled between the input radiation transmissive substrate and the light valve array, with the input radiation being incident upon the photoemissive means to generate photoelectrons which produce a charge pattern upon the deflectable portions of the light valves. This charge pattern corresponds to the input radiation and causes deflection of the light valves. Output radiation imaging means is provided for directing output radiation onto the light valve array through the imaging substrate. The output radiation is reflected from the deflected light valves and passes back through the imaging radiation transmissive substrate as a function of the input radiation image. Optical imaging means are provided for discriminating between output radiation reflected from the deflected light valves and from radiation reflected from undeflected light valves.

DESCRIPTION OF THE PREFERRED EMBODIMENTS

Figure 1:
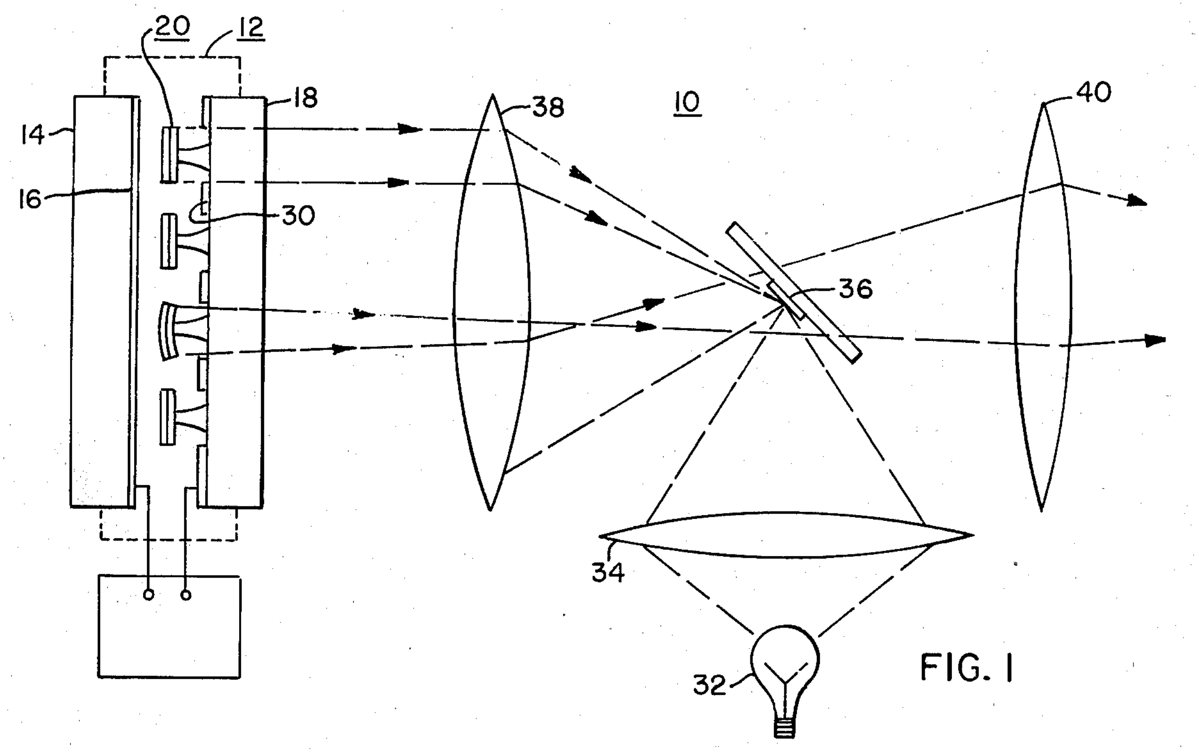
FIG. 1 is a schematic representation of an optical imaging system of the present invention.

The invention can be best understood by reference to the exemplary embodiments in the drawings. In the embodiment shown schematically in FIG. 1, the optical imaging system 10 comprises a hermetically sealed evacuated device 12 one portion of which comprises an input radiation transmissive substrate 14. A conductive thin film transparent electrode 16 is disposed on an interior surface of the substrate 14. Spaced from the input substrate 14 and generally opposite thereto is the imaging radiation transmissive substrate 18. A target array 20 of electrostatically deflectable reflective light valves 22 are supported from the interior surface of the imaging substrate 18. The light valves 22 are shown here in greatly enlarged representation in order to facilitate understanding. The target array 20 actually comprises several hundred thousand of such light valves 22 for a typical target array. The light valves 22 are seen in greater detail in FIG. 2. A central support post 24 extends from the interior surface of the substrate 18. A generally planar deflectable and reflective portion 26 is disposed at the extending end of post 24. A photoemissive layer 28 is provided on the surface of planar portion 26 exposed to the input substrate 14. An electrode grid network 30 is provided upon the substrate 18 as a thin conductor film disposed approximate the edges of the planar portions 26 and between adjacent light valves. The transparent electrode 16 is connected to a potential source as is grid electrode 30. A light source 32 is disposed external to the sealed device 12 and the light is focused via lens 34 onto a Schlieren optical means 36 from which the light is reflected passing through collimating lens 38 and is directed onto the underside of the reflective planar portions 26 of the light valves 22. Radiation which is reflected from a deflected light valve 22 is directed back past the Schlieren optical means 36 around the central stop and passes through lens 40 to be focused or projected on a display screen. Light which is reflected back from an undeflected light valve is focused onto the central stop of the Schlieren optical means and is reflected back to the light source. In this way, output radiation from the external light source 32 is utilized to form an image which corresponds to an informational pattern established on the light valve.

Input radiation, typically light, passes through the transparent substrate 14, the radiation transmissive electrode 16 and strikes the photoemissive layer 28 on the light valve. The input radiation produces electron emission from layer 28. The potential of electrode 16 is such as to collect the negatively charged electrons and the light valve is positively charged as a result of this electron emission. It is the potential difference between this positively charged light valve and grid 30, typically at ground potential, which produces the electrostatic deflection force. Erasure of the charge is accomplished by adjusting the potential of electrode 16 to equal the potential of grid 30, and flooding the light valve array with input light.

The device shown and described in FIG. 1 can be used for imaging low intensity light, wherein the input radiation is utilized to produce the image pattern upon the light valve array, while the output or interrogating radiation is used to recreate the image pattern for display or projection. The embodiment described in FIG. 1 can also be used to form an image wherein the output radiation wavelength is significantly different from the input radiation wavelength, while maintaining the basic informational pattern.

Figure 2:
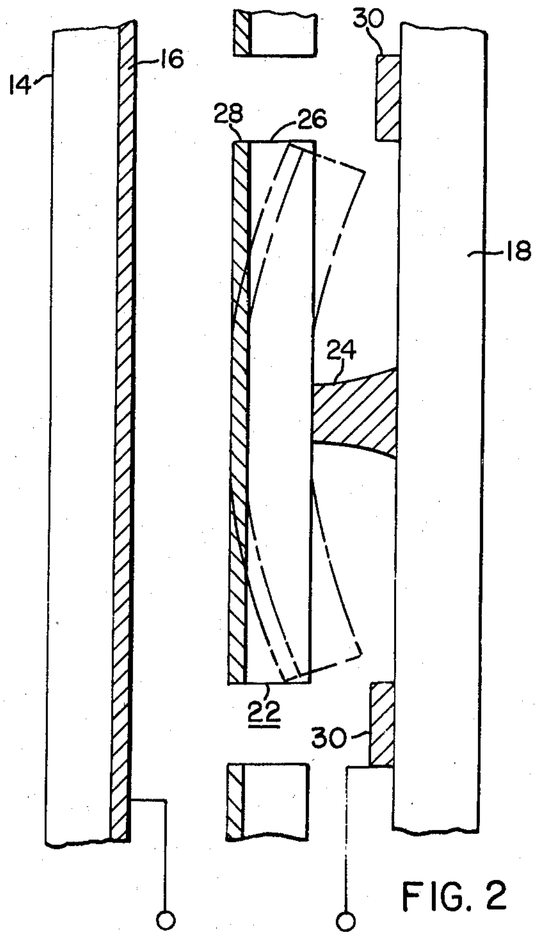
FIG. 2 is an enlarged schematic representation of a portion of the optical imaging system of FIG. 1 which shows in greater detail a single light valve element coupled to the photoemissive means.
Figure 3:
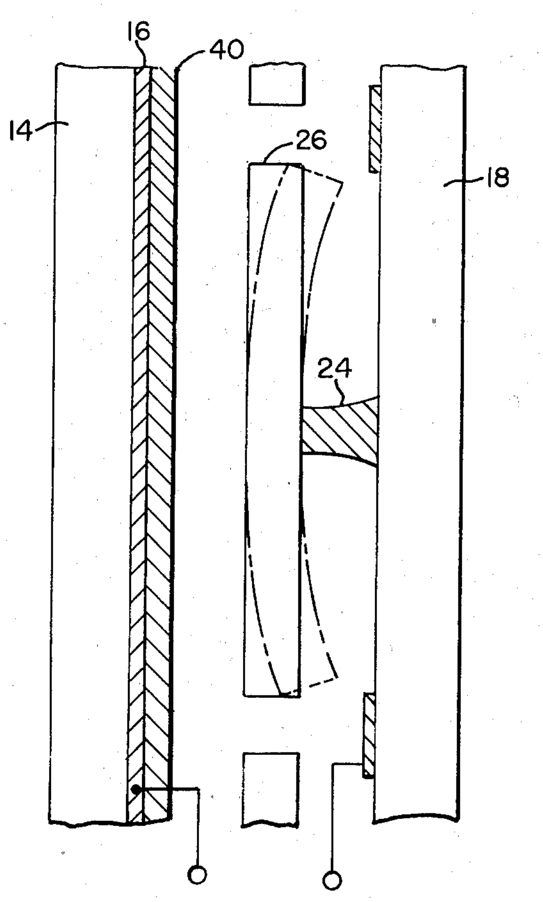
FIG. 3 is an enlarged schematic representation similar to FIG. 2 on an alternate embodiment for coupling the light valve target to the photoemissive means.

In the embodiment described in FIG. 2, the photoemissive layer 28 is shown as disposed upon the generally planar portion 26 of light valve 22. In the embodiment seen in FIG. 3, a photoemissive layer 40 is disposed upon the radiation transmissive electrode 16 disposed in turn upon input substrate 14. No photoemissive layer is provided upon the planar portion 26 of the light valve 22 in this embodiment. By depositing the photoemissive material on the input substrate rather than on the light valve or electro-mirror element a wider variety of photoemissive materials can be used since the photoemissive layer is not subjected to deflection.

It is desirable to be able to avoid having the output or interrogating radiation producing photoemission from the photoemissive layer. Thus, for example, the input substrate 14 can be made transmissive to short wavelength ultraviolet radiation with a photoemissive material which is activated by such short wavelength ultraviolet radiation, while the imaging substrate 18 is transmissive to radiations of a visible spectra but is not transmissive to ultraviolet radiation. Such a device will result in a complete separation between the input radiation and the output or readout light which will be in the visible spectra. The same basic principle can be applied in the embodiment seen in FIG. 2 but the deposition of the photoemissive material upon the light valve element which is deformable and restricts the type of photoemissive material that can be used.

Figure 4:
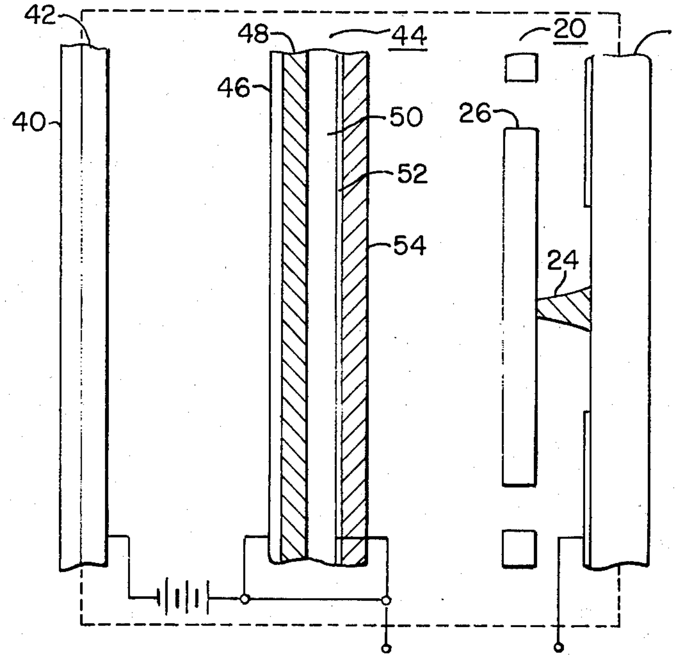
FIG. 4 is an enlarged schematic similar to FIG. 2 of a single light valve element coupled to an alternate photoemissive means, which includes an intensifier means.

The embodiment seen in FIG. 4 incorporates a light intensifier means in the basic system. The light valve target array 20 is substantially the same as already described with respect to FIG. 3. An intensifier assembly 44 is disposed between the input substrate 40 and the imaging substrate 41. The intensifier assembly 44 comprises a thin radiation transmissive electrode 46 disposed facing the input substrate. A phosphor layer 48 is disposed adjacent the transmissive electrode 46, and comprises a finely divided phosphor material which is excitable by the input radiation to produce photons which are directed through the fiber optic panel 50 which is disposed adjacent the phosphor layer 48. A second radiation transmissive electrode 52 is disposed on the other side of the fiber optic panel 50, and emissive layer 54 is disposed on the transmissive electrode 52. A photocathode layer 42 is disposed on the interior surface of input substrate 40.

In the embodiment of FIG. 4, the input radiation from the scene of interest passes through input substrate 40 and impinges on photocathode layer 42 to generate electrons which are accelerated in the electric field produced by maintaining electrode 46 at several kilovolts. The electrons excite the phosphor layer 48 to produce radiant energy which passes through the fiber optic plate 50. This radiant energy is thus efficiently transmitted through transmissive electrode 52 to impinge the photoemissive layer 54 to produce electrons which charge the reflective planar portion 26 as described for the other embodiments. The interrogating radiation, preferably visible light passes through the imaging substrate 41 and is reflected back therethrough as an image pattern which corresponds to the informational charge pattern upon the light valve target array.

The intensifier provides an operating gain which permits operation of the system at low light levels. The input radiation from the scope can be visible light or infrared radiation, with the interrogating or output radiation being coherent radiation or incoherent visible light.

It is apparent that the embodiment of FIG. 4 can be used to selectively respond to input radiation. The input substrate material can be selected to be transmissive to radiation of wavelength greater than $\lambda_1$, with the first layer of photoemissive material related to respond to radiation of a wavelength less than $\lambda_2$. Thus, the system will be responsive to input radiation of wavelength $\lambda$ when $\lambda_1 < \lambda < \lambda_2$.

Figure 5:
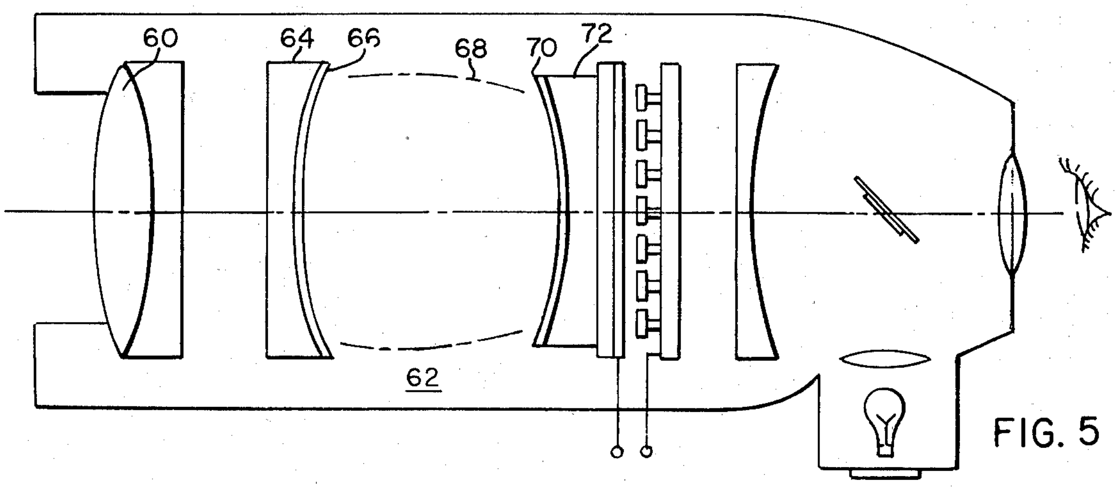
FIG. 5 is a schematic representation of an infrared image viewer embodiment of the present invention which has both storage capability and projection capability.

The system illustrated in FIG. 5, is a low light level infrared sensor and viewer with a storage and projection capability.

The system comprises an input radiation lens 60 through which the input infrared radiation is directed and collimated. The radiation passes to the infrared image intensifier section 62, which comprises a first fiber optic array 64, having a photoemissive layer 66 on the output side of the fiber optic array 64. An electron focusing electrode 68 is shown schematically about the system axis for directing and focusing the emitted photons upon the phosphor layer 70 disposed on a second fiber optic array 72. The focused photons excite the phosphor to produce radiation which pass through the second fiber optic array 72. The remainder of the system is essentially as shown and described with respect to FIG. 1, with the photoemissivity coated light valve target array used to effectuate imaging of the output radiations.

Figure 6:
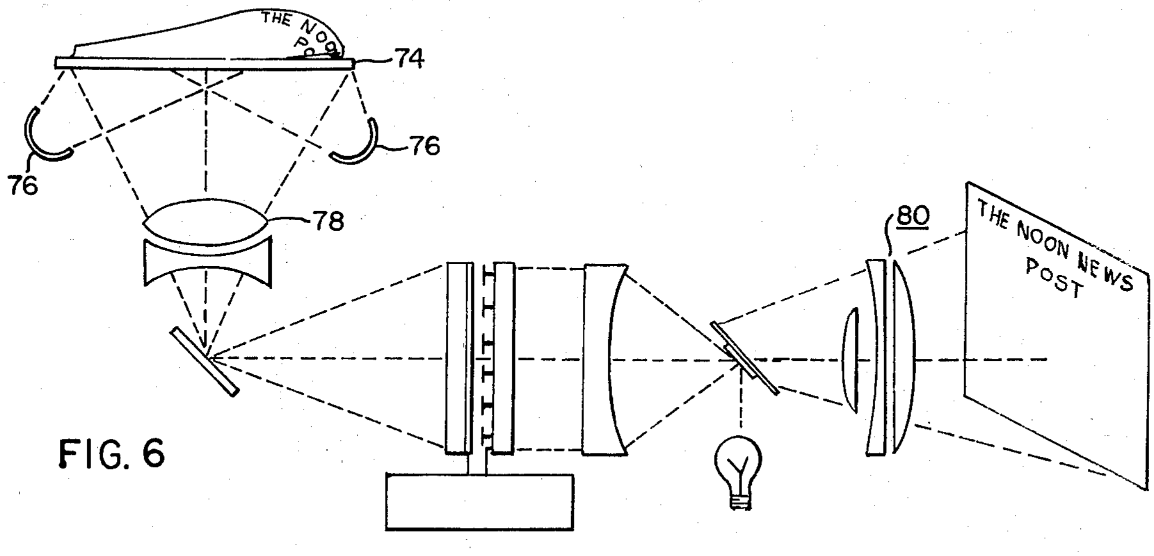
FIG. 6 is another embodiment utilizing the system of the present invention for projecting and displaying an image pattern.

In yet another embodiment seen in FIG. 6, a classroom bright screen projector system is illustrated. The copy to be viewed is placed upon viewer plate 74, which is brightly illuminated by light sources 76. The image of the copy is focused via lens 78 to a 45° mirror and onto an imaging system as described with respect to FIGS. 1, 2, and 3, with a projection lens system 80 being utilized to project the copy image upon a screen.

The imaging system of the present invention can also be operated in a "gated" mode of operation, i.e. a gate signal is applied as a potential across the electrodes 16 and 30 of FIG. 1 rather than a continuous potential signal. Only when the gate signal is applied will the image information content be transferred to the mirror array. This gated operation allows for a flash snapshot of the image scene without the mirror array recording any background noise. The mirror array will remain charged, providing a memory capability, with the viewing taking place at the desired time.

We claim:

1. An optical imaging system comprising an evacuated hermetically sealed system comprising:

an input-radiation-transmissive substrate;

a imaging-radiation-transmissive substrate spaced from the input-radiation-transmissive substrate;

an array of electrostatically deflectable, reflective light valves supported upon the imaging substrate, which light valves each comprise a support post extending from the imaging substrate with a generally planar deflectable and reflective portion disposed at the extending end of the central support post;

an electrode grid disposed upon the imaging substrate between the spaced apart light valves;

a photoemissive means coupled between the input radiation transmissive substrate and the light valve array, with the input radiation being incident upon the photoemissive means to generate photoelectrons which produce a charge pattern upon the deflectable portions of the light valves, which charge pattern corresponds to the input radiation causing deflection of the light valve; and output radiation imaging means for directing output radiation onto the light valve array through the imaging substrate, with the output radiation being reflected from the deflected light valves and passed through the imaging radiation transmissive substrate as a function of the input radiation.

2. The system specified in claim 1, wherein the photoemissive means comprises a layer of photoemissive material disposed upon the surface of the generally planar deflectable portion of the light valves which is exposed to the input substrate.

3. The system specified in claim 1, wherein the photoemissive means comprises a layer of photoemissive material disposed upon the interior surface of the input substrate.

4. The system specified in claim 1, wherein the photoemissive means comprises a first layer of photoemissive material disposed upon the interior surface of the input substrate, an intensifier means spaced between the input substrate and the light valve array, which intensifier means comprises a generally planar array with a first photon transmissive electrode layer exposed to the photoemissive layer upon the input substrate, a phosphor layer adjacent the first transmissive electrode layer, a fiber optics light directing array extending from the phosphor layer toward the light valve array, a second photon transmissive electrode layer adjacent the extending end of the fiber optic array, and a second photoemissive layer disposed adjacent the second photon transmissive electrode layer.

5. The system specified in claim 4, wherein the photoemissive means comprises an input substrate which is transmissive to radiation greater than $\lambda_1$, and said first layer of photoemissive material is excitable by radiation of wavelength less than $\lambda_2$, where $\lambda_2 > \lambda_1$, so that the system is responsive to input radiation $\lambda$ where $\lambda_1 < \lambda < \lambda_2$.

6. The system specified in claim 1, wherein an intensifier is spaced between the input substrate and the light valve array which intensifier means comprises a generally planar array with a first input radiation transmissive electrode layer exposed to the input substrate, a phosphor layer adjacent the first transmissive electrode layer, a fiber optics light directing array extending from the phosphor layer toward the light valve array, a second radiation transmissive electrode layer adjacent the extending end of the fiber optic array, and a photoemissive layer disposed adjacent the second radiation transmissive electrode layer.

7. The system specified in claim 1, wherein the output radiation imaging means includes a Schlieren optical means which is transmissive to radiation reflected from deflected light valves, but which is non-transmissive to radiation reflected from non-deflected light valves.

* * * * *